Patented Oct. 28, 1930

1,779,944

UNITED STATES PATENT OFFICE

JOSEPH J. LAWTON, OF SYRACUSE, NEW YORK, ASSIGNOR TO SEMET-SOLVAY COMPANY, OF NEW YORK, N. Y., A CORPORATION OF NEW YORK

PROCESS OF NEUTRALIZING WASHED LIGHT OIL

No Drawing.   Application filed December 31, 1927. Serial No. 244,051.

The present invention relates to the refining of crude light oil recovered from gases produced during the destructive distillation of coal, and particularly to an improved process for neutralizing such oils after washing with sulfuric acid.

Crude light oil as ordinarily recovered from coke oven or similar gases produced during the destructive distillation of coal, is made up of a fraction comprising benzol, and its homologues, toluene, xylene, etc. and a relatively small quantity of other compounds including olefins, coumarone oil, naphthalene and other relatively high boiling compounds and frequently small quantities of the straw oil or other light oil absorbing medium used in the separation of the light oil from the coke oven gases.

In refining such oils, the usual practice is to first wash them thoroughly with sulfuric acid, thereby separating certain undesirable constituents such as olefins. After the acid wash treatment, the major part of the wash acid now containing these undesirable constituents of the light oil is drained off in the form of an acid sludge. The separation of the acid from the oil is incomplete since a small quantity of the acid is always unavoidably left in the washed oil. To overcome this difficulty the oil is mixed and thoroughly agitated with caustic soda solution, to neutralize the residual acid and render the oil fit for further treatment.

I have found that ammonia can be used in place of caustic for neutralizing the washed light oil, and that it possesses several important advantages thereover, particularly when the neutralized light oil is subjected directly after the neutralization treatment to a purification treatment involving a direct steam distillation, as described for example in application Serial No. 600,636, Torrey and Sanford.

The non-use of ammonia heretofore may be explained by the fact that it was believed that a strong alkali such as caustic soda was more efficient, and to operating difficulties due to emulsions in the washed oil which prevented an efficient separation of the aqueous neutralizing solution. These emulsions are broken down by caustic soda, but apparently resist or are aggravated by the action of ammonia.

A more complete understanding of my invention and its advantages may be obtained by a consideration of its application according to a particular example as follows:

2,800 gallons of a crude light oil are mixed with 70 gallons of 66° Bé. sulfuric acid and the mixture thoroughly agitated for about 45 minutes. The washing apparatus used comprises preferably a cylindrical tank having a cone-like bottom and equipped with a suitable agitator, although any other suitable form of washing apparatus may of course be adopted. The resulting acid sludge is permitted to settle and is then drained off at the bottom of the vessel, the separation being made as complete as possible.

The remaining oil is then again agitated and 17 gallons of a 28% aqueous solution of ammonia mixed therewith. After agitating this mixture for about five minutes, tests are made of the washed oil against a methyl orange indicator and ammonia again added in small amounts until the oil tests neutral.

After the neutralizing treatment, the oil is passed immediately or directly, that is without being subjected to a settling treatment adapted to effectively separate the aqueous neutralizing liquor, to a still. Some separation of the aqueous neutralization liquor from the neutralized oil may be made before it is introduced into the still; however, according to the preferred embodiment of my invention this separation is omitted or no special care is taken to make it complete, and preferably a small quantity at least of this liquor is permitted to remain in the oil introduced in the still, for reasons which will appear hereinafter.

In the still, the neutralized oil is contacted directly with steam which volatilize relatively low boiling constituents, benzol, and homologues thereof, and breaks down the emulsions present therein while the ammonium sulfate content of the oil together with certain high boiling constituents such as paracoumarone are separated as a distillation residue. The volatilized oils are condensed and the condensate subjected to further refining treatment as desired.

Separation of ammonia sulfate and other products of the neutralizing step by the distillation operation as described has important advantages. One of these is the saving of time ordinarily consumed in permitting the oil to stand in the agitator until a complete separation of the aqueous neutralization liquor is effected. Further, when a complete separation of the neutralization liquor is made by settling, an unavoidable loss of washed oil occurs, which loss is avoided by the above procedure. Another advantage is a beneficial effect which the presence of the neutralization liquor appears to exert during the distillation operation in preventing or decreasing the tendency for formation of decomposition products during the distillation operation. This beneficial effect may be attributed to an alkaline condition brought about in the still due to the presence of a certain quantity of ammonia volatilized in the still from the neutralization liquor.

If desired the ammonium sulfate may be recovered, and hence constitutes a valuable by-product.

In place of aqueous ammonia solutions, an equivalent amount of gaseous ammonia might be used. Gaseous ammonia has some advantages over ammoniacal solutions in the practice of my invention. However, I prefer to use ammonia in the latter form since it is less expensive and involves less difficulties in its application.

In the actual practice of the invention as above described it has been ascertained that ammonia has a number of important advantages over caustic. When caustic is used, it must be thoroughly agitated with the oil for a relatively long period in order to produce a sufficiently intimate contact therebetween, and even then substantial quantities of the caustic fail to interact with the residual acid and finally are discharged as waste with the acid sludge. Ammonia, probably because of its volatile character, saturates the wash oil very quickly and little, if any, of it remains unreacted and consequently waste is reduced to a minimum. By using ammonia the possibility of accidents due to caustic burns is avoided. Further, its use results in a considerable shortening of the time required for the neutralization treatment because of its rapid interaction with the acid content of the oil, and because it obviates the necessity of allowing the oil to settle after the neutralization treatment since the ammonium sulfate is readily separated in the subsequent steam distillation treatment. Another important advantage resulting from the use of ammonia is the substantial saving due to the lower cost of this material compared with the amount of caustic required to secure comparable results, and because of the value of ammonium sulfate as a by-product.

While in the preferred form of my invention as above described emulsions present in the oil after the neutralization treatments are broken up and a separation of the oil obtained by a subsequent direct steam distillation, it may be found desirable to use other methods such as centrifuging for breaking up these emulsions. It is to be understood that the example given above is merely illustrative of the preferred embodiment of the invention and various changes may be made in the procedure set forth therein without departing from the essential features of my invention, the scope of which is not to be limited except as is indicated in the claims annexed hereto.

The term crude light oil as used in the claims and specification is to be understood as designating light oil which require a sulfuric acid wash treatment to render them suitable for further refining, and is to be understood as including crude light oils which have undergone a partial refining treatment as for instance by a preliminary distillation for the purpose of separating therefrom a fraction of the high boiling constituents.

What I claim is:

1. A process of refining crude light oil, obtained in the destructive distillation of coal, which comprises washing the crude light oil with sulfuric acid, separating resultant acid sludge from the washed oil, treating the washed oil with ammonia to neutralize residual acid therein and form a neutralization liquor, and separating low boiling constituents from the neutralized oil by direct steam distillation in a still while maintaining an alkaline condition in said still by the presence therein of said neutralization liquor.

2. A process of refining crude light oil, obtained in the destructive distillation of coal which comprises washing the crude light oil with sulfuric acid, separating the resultant acid sludge from the washed oil, treating the washed oil with ammonia to neutralize residual acid therein, and separating low boiling constituents from the neutralized oil by direct steam distillation in the presence of neutralization liquor thereby breaking up emulsions present therein, and preventing the decomposition and volatilization of any sulfur compounds present in the neutralized oil.

3. A process of refining crude light oil, obtained in the destructive distillation of coal which comprises washing the crude light oil with sulfuric acid, separating resultant acid sludge from the washed oil, treating the washed oil with ammonia to neutralize residual acid therein, and then directly thereafter passing steam through the neutralized oil containing neutralization liquor admixed therewith to volatilize the low boiling constituents, thereby breaking up emulsions present therein and separating said low boiling constituents from ammonium sulfate of the neutralizing step and higher boiling constituents of said neutralized oil.

In witness whereof, I have hereunto set my hand.

JOSEPH J. LAWTON.